Figure 1:
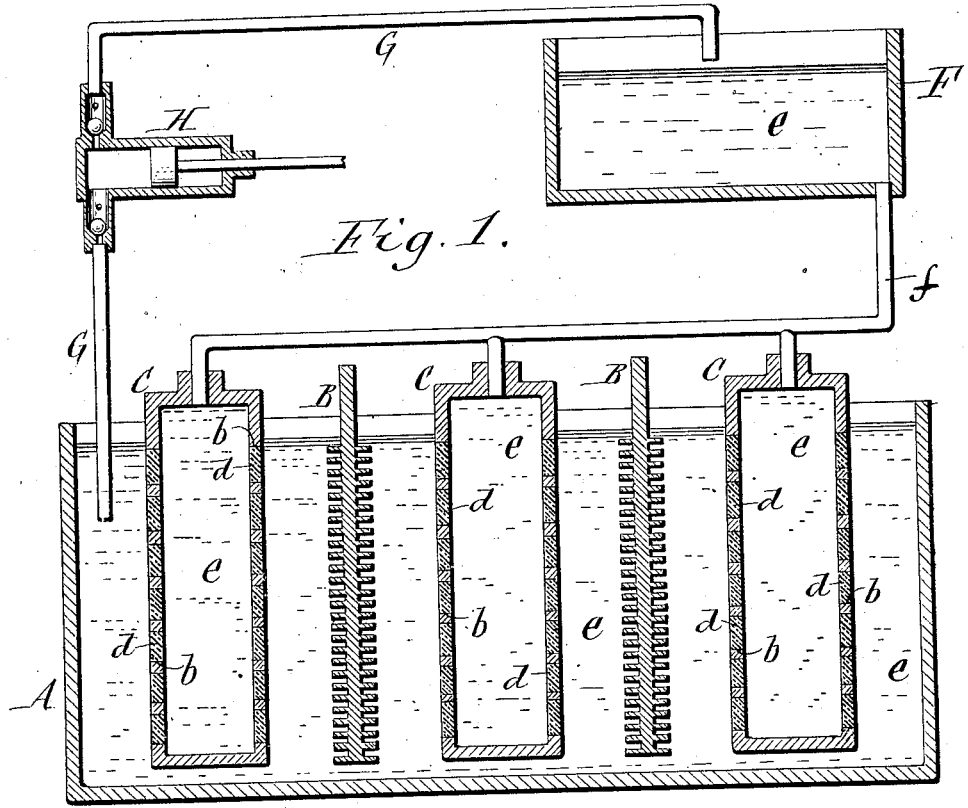

No. 852,464. PATENTED MAY 7, 1907.
E. SOKAL.
STORAGE BATTERY.
APPLICATION FILED MAY 4, 1906.

3 SHEETS—SHEET 1.

Witnesses: Louis W. Gratz, Richard Sommer

Edward Sokal, Inventor
by Geyer & Papp, Attorneys

No. 852,464. PATENTED MAY 7, 1907.
E. SOKAL.
STORAGE BATTERY.
APPLICATION FILED MAY 4, 1906.
3 SHEETS—SHEET 2.
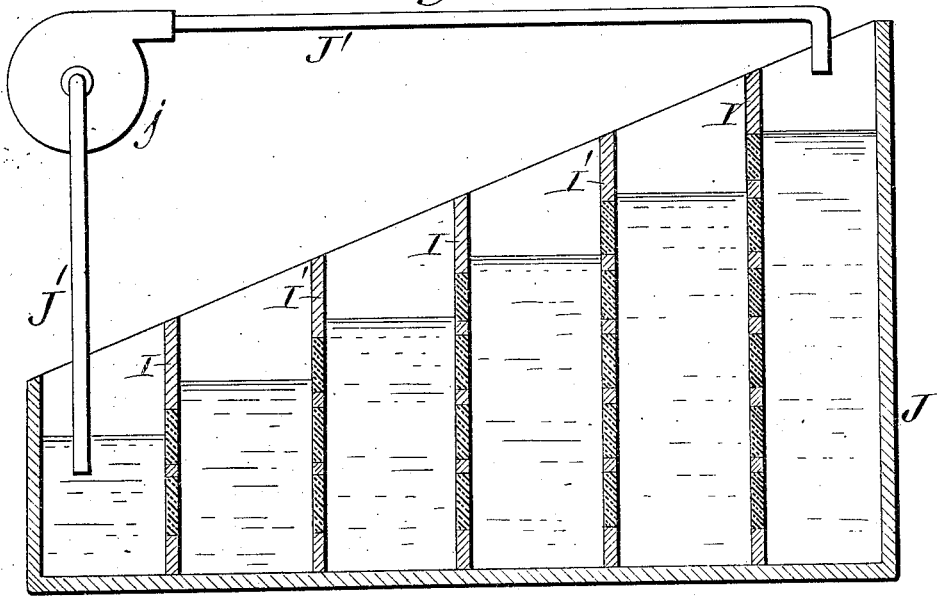
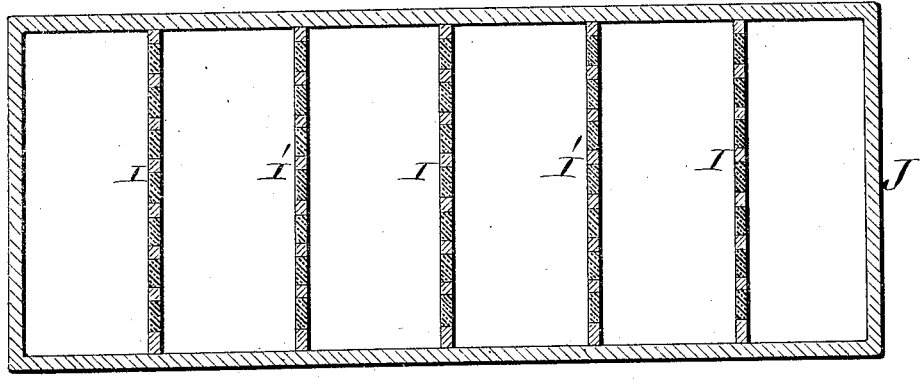
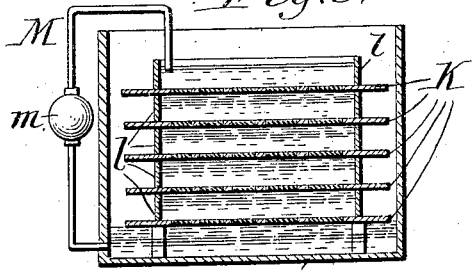
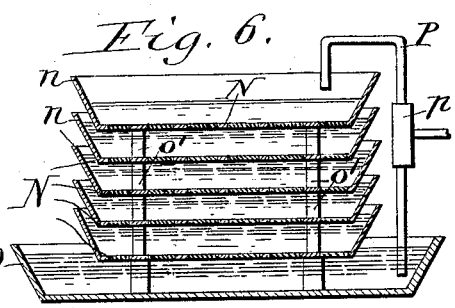

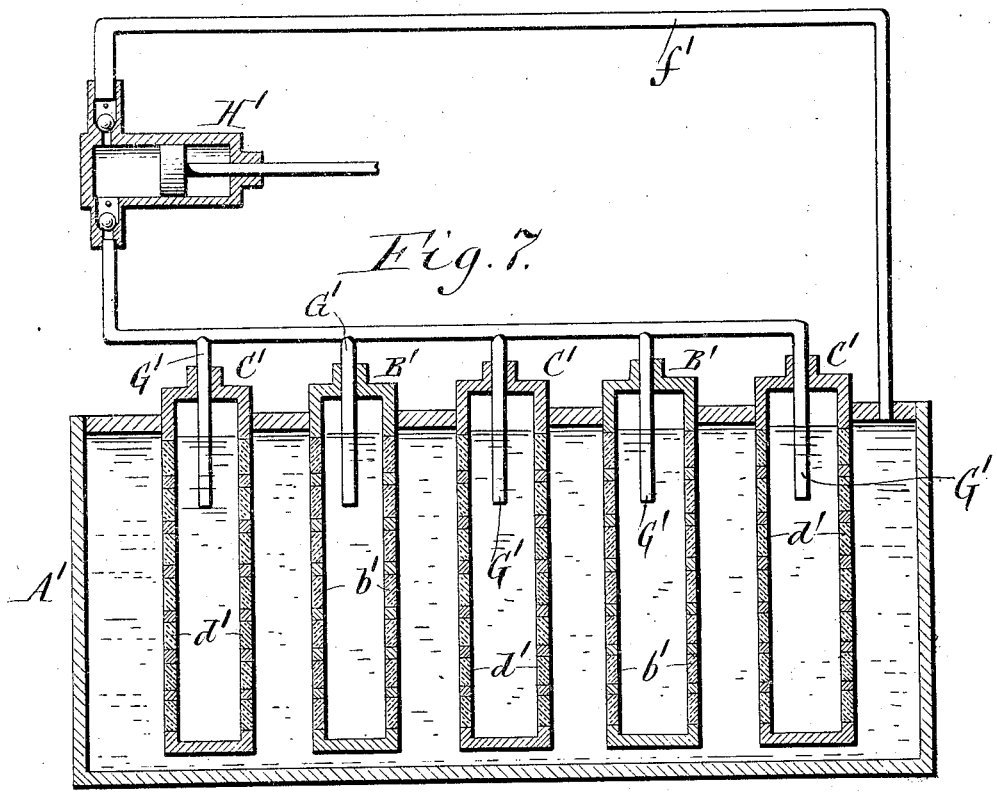
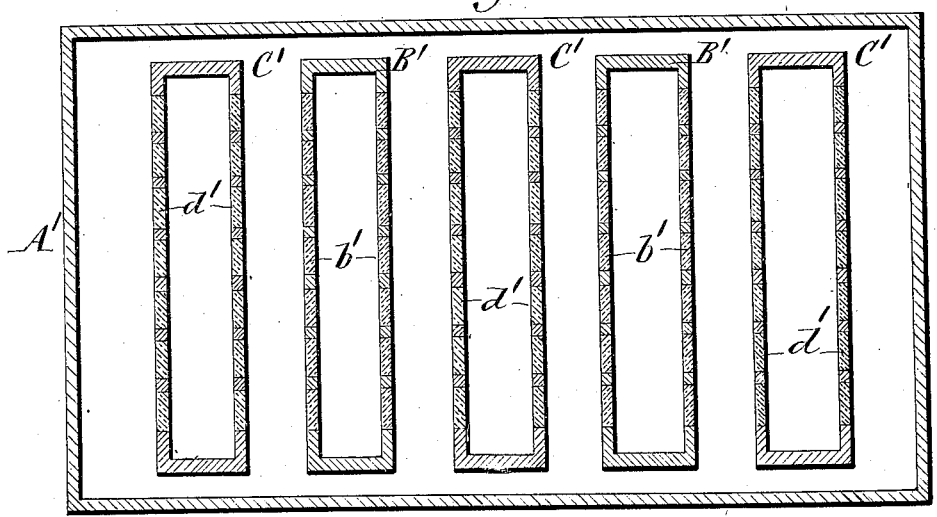

UNITED STATES PATENT OFFICE.

EDWARD SOKAL, OF BINGHAMTON, NEW YORK, ASSIGNOR OF ONE-THIRD TO SIGMUND BLOOMFIELD, OF ELKHART LAKE, WISCONSIN, AND ONE-TWELFTH TO SIGMUND B. WOLF AND ONE-TWELFTH TO CHARLES WOLFF, OF CHICAGO, ILLINOIS.

STORAGE BATTERY.

No. 852,464.   Specification of Letters Patent.   Patented May 7, 1907.

Application filed May 4, 1906. Serial No. 315,130.

*To all whom it may concern:*

Be it known that I, EDWARD SOKAL, a citizen of Austria, residing at Binghamton, in the county of Broome and State of New York, have invented new and useful Improvements in Storage Batteries, of which the following is a specification.

This invention relates more particularly to storage batteries and has for its object to keep the concentration of the electrolyte in the pores of the electrode or plate practically constant in all stages of charge and discharge of the battery, even at very various rates of charge and discharge whereby the capacity of the storage battery for a given amount of lead or active material is considerably increased. Furthermore the capacity at high rates of discharge by this means is nearly equal to the capacity at low rates of discharge the ampere and watt efficiency of the battery is considerably improved, the durability of the negative electrode in lead storage batteries is increased and the weight of the storage-battery is considerably reduced. This invention is applicable to stationary batteries as well as the traction batteries used in electric carriages, sparkers, electric boats, street-cars etc. That at the discharge of a storage battery the concentration of the electrolyte drops in the pores of the electrodes proportionally to the rate of discharge and that at the charge of the same the concentration of the electrolyte rises in the pores of electrodes proportionally to the rate of charge, may be regarded as a fact scientifically established. This drop and rise of concentration, which can be usually measured in the electrolyte surrounding the electrodes, is obviously greatest in the pores of the electrodes, it having been proven that a considerable surplus of surrounding electrolyte cannot prevent the drop and rise of concentration in the pores of the electrodes, where the chemical reaction takes place. The equalization of this difference of concentration takes place in the present storage batteries owing to the natural tendency and force of diffusion. The knowledge of storage batteries up to the present has been insufficient to keep the drop and rise of concentration anywhere within the limits of the drop and rise in the surrounding electrolyte, which latter drop and rise are of considerable importance inasmuch as the quantity of electrolyte, particularly in traction batteries must be kept within close limits. It is also known that the drop of concentration of the electrolyte while discharging causes a drop of the electromotive force of the battery and consequently limits the available capacity and increases the losses of electrical energy in the operation of the storage battery, while the rise of concentration of the electrolyte during charging increases the counter electro-motive force of the battery and consequently also increases the losses of electrical energy, in other words, diminishes the ampere and watt efficiency of the storage battery. All these evils are particularly aggravated when charging or discharging at high rates, at which time the natural diffusion is still less able to keep pace with the electrochemical action. An interesting fact, which corroborates these statements and is known to every expert in storage batteries, is that batteries which have been discharged at a high rate to the full limit of their capacity, are able to recover and show a higher voltage and quite an appreciable remaining capacity after resting for a certain length of time and after the diffusion of the electrolyte has had time to raise its concentration in the pores of the electrode.

A further disadvantage in lead storage batteries of the changes of concentration of electrolyte in this manner is that owing to lead being much more soluble in dilute and concentrated electrolyte than in the electrolyte of the density which is originally used in storage battery operation, the change of concentration favors the dissolution of the active material of the negative electrode (spongy lead) and its subsequent deposition in a form, which is not porous and electrochemically inert.

My invention, which does away with all the difficulties and disadvantages mentioned above, in lead storage batteries and any other storage battery in which concentration of the electrolyte or electrolytic ions during charge or discharge has a bearing on its operation, consists in maintaining a practically uniform concentration of the electrolyte in all stages of charge and discharge of the battery by assisting the diffusion and continuously pushing or forcing the electrolyte through the electrodes during charging and discharging. The driving force which pushes the electrolyte through the electrodes may be either machine pressure controlled manually or by automatic means, or natural gravity can be used alone. I find it to be sufficient and preferable to use the natural gravity, which of course, may, in my device be replaced or assisted by machine pressure. In order to obtain this effect, the so called "Faure" or pasted electrodes or in non-lead batteries, similarly constructed porous electrodes which are porous and permit the passage of the electrolyte through the body of the electrode, are used and they are arranged in a manner that a difference of the level of the electrolyte simply according to the laws of gravity drives the electrolyte and makes it flow continuously through the electrode while in operation in charge or discharge, this difference of level being kept constant by means of a siphon, pump or other means. I have found that in this way the available capacity of the electrodes is more than doubled for a given amount of active material, that the capacity can be kept about the same for very different rates of discharge by increasing the difference of level and consequently the rapidity of flow of the electrolyte through the electrode according to the rate of discharge, that the ampere and watt efficiency of any storage battery in which concentration of electrolyte or electrolytic ions during charge or discharge has a bearing on its operation, is considerably improved, that the negative electrode maintains its capacity for a much greater time of service and that, finally, due to the increase of capacity, only about half of the weight of the present storage-battery is needed, in order to obtain a certain capacity. Although in stationary batteries the saving of lead or active material only results in a reduction of cost, in the case of traction-batteries the item of the diminution of the weight is of paramount importance.

Figure 2:
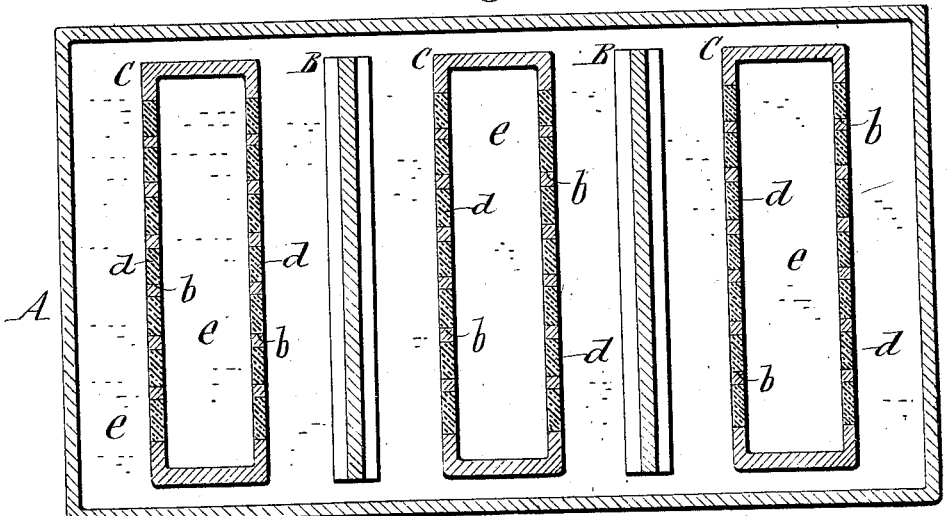

In the accompanying drawings consisting of three sheets: Figure 1 is a sectional elevation of a storage battery embodying my invention in its preferred form. Fig. 2 is a horizontal section of the same. Fig. 3 is a sectional elevation showing a modified construction of my invention. Fig. 4 is a horizontal section thereof. Figs. 5 and 6 are sectional elevations showing further modifications of my invention. Fig. 7 is a sectional elevation showing a storage battery constructed in accordance with my invention and having both electrodes of its elements made hollow and porous. Fig. 8 is a horizontal section of the last mentioned construction.

Similar letters of reference indicate corresponding parts throughout the several views.

Referring to Figs. 1 and 2, A represents a jar, tank or vessel of glass, lead or any other suitable material. B represents the negative electrodes and C the positive electrodes which are arranged in the jar and which may be connected in series or in parallel. These electrodes may be supported in any suitable manner in the jar. If the latter is made of glass or similar material the electrodes may rest directly on the jar but if the same is made of lead means for insulating the jar and electrodes must be provided in any well known manner. As shown in Figs. 1 and 2 the negative electrodes consist of the usual vertical plates which are adapted to be coated with spongy lead and alternate with the positive electrodes. Each of the latter is preferably constructed in the form of a hollow skeleton frame or grid of any suitable shape that shown in the drawings, for example having openings $b$ in its walls which contain fillings $d$ of lead peroxid. The space within the hollow electrodes as well as the space in the jar which surrounds the positive and negative electrodes is filled with the electrolyte $e$. The level of the electrolyte on the inner side of the hollow electrode is higher than that on the outer side thereof so that the force of gravity will have the effect of pushing or forcing the electrolyte from the inside of the hollow electrode outwardly through the porous fillings $d$ thereof into the space of the jar around the outside of the hollow electrode.

During charging of the storage battery the electrolyte becomes more concentrated in the pores of the hollow electrode while during discharging of the same the electrolyte becomes more diluted in the pores of said electrode. This tendency is more pronounced as the rate of charging or discharging increases and thus reduces the efficiency of the battery accordingly. By exerting a pressure on the electrolyte on the inside of the hollow electrode whereby the electrolyte is caused to forcibly flow through the pores of the same a constant dilution of the acid in the pores of the hollow electrode takes place during charging of the battery while a constant enriching of the electrolyte occurs in the pores while discharging the battery, thereby maintaining the degree of concentration uniform at all times throughout the entire electrolyte.

In order to compensate for the outflow of electrolyte from the hollow electrodes and maintain the level in the same higher than in the jar, means are provided for withdrawing the electrolyte from the jar and returning the same to the hollow electrode. Instead of returning the electrolyte immediately from the jar and around the hollow electrode to the inside of the latter it is also desirable to first lift the electrolyte from the jar into an elevated reservoir or supply tank from which the same is delivered to the hollow electrode. Various means may be employed for accomplishing this purpose. As shown in Fig. 1, a supply reservoir or tank F is arranged at a higher elevation than the jar and electrodes and the hollow electrodes are connected with the reservoir by a supply pipe or conduit $f$ of rubber or other suitable material connected at one end with the lower part of the reservoir while its other end is connected with the upper ends of the hollow electrodes. The connection between the supply conduit and the hollow electrodes and reservoir is tight so that the column of liquid electrolyte extends from the inside of the hollow electrodes upwardly through the supply conduit and into the reservoir and finds its level in the latter.

G represents a return pipe or conduit extending from the jar outside of the hollow electrode to the top of the reservoir. H represents a reciprocating pump arranged in the return pipe and operating to lift or elevate the electrolyte from the jar into the reservoir. This pump may be operated in any suitable manner for maintaining the required differential in levels of the electrolyte in the jar and hollow electrodes. When installed on a vehicle propelled by storage batteries the pump H may be connected with a suitable moving part of the driving mechanism.

The flow of the electrolyte through the electrodes should be regulated so that the variations in the concentration of the electrolyte during charge and discharge are balanced and pace is kept with the electrochemical action in the pores of the electrodes. This may be effected either by varying the speed of the pump H, or by means of regulating valves placed in the supply pipe $f$ and the return pipe G.

Obviously the negative electrodes may be made hollow and filled with an electrolyte instead of the positive electrodes or both positive and negative electrodes of a battery may be made hollow and filled with electrolyte, the changes of concentration being practically the same in both electrodes of an element. If desired the battery may be organized that the level of the electrolyte is higher in the jar than in the hollow electrode in which case the electrolyte would be pushed or forced by gravity from the jar through the pores of and into the inside of the hollow electrode the movement of the electrolyte being reversed or in the opposite direction to that described with reference to Figs. 1 and 2.

A storage battery embodying my invention and having both electrodes of each element made hollow and supplied with electrolyte so that the same flows through the porous electrodes from the outside thereof is shown in Figs. 7 and 8. In these views $B^1$ represents hollow negative electrodes each having its walls constructed in the form of skeleton frames or grids which contain porous spongy lead fillings $b^1$ and $C^1$ represents hollow positive electrodes each having its walls constructed in the form of skeleton frames or grids containing porous lead peroxid fillings $d^1$.

$H^1$ represents a pump having its inlet connected by branch pipes $G^1$ with the spaces within the electrodes for withdrawing the electrolyte therefrom and $f^1$ a return pipe whereby the electrolyte is conducted from the outlet of the pump back into the jar $A^1$ which contains the electrodes. As shown in Fig. 7 the top of the battery jar $A^1$ is closed so that a tight connection is produced between the jar $A^1$ and the pump $H^1$ whereby the latter is caused to force the electrolyte through the electrodes by mechanical pressure regardless of the difference in levels of the electrolyte on the inner and outer sides of the electrodes.

Instead of constructing one or both of the electrodes of each element hollow for the purpose of permitting different levels of electrolyte to be established relatively thereto the same effect may be produced by constructing the negative and positive electrodes I, $I^1$ in the form of porous plates which are arranged vertically in a longitudinal row in the jar J and fitted tightly at their lower and side edges against the bottom and side walls of the jar so that they form partitions which divide the jar into a plurality of compartments or chambers, as shown in Figs. 3 and 4. The electrolyte in these compartments is successively lower from the compartment at one end of the series to the compartment at the other end of the series so that the electrolyte flows from one compartment through the intervening porous electrodes and into the next compartment in which the electrolyte is of a lower level. From the compartment of lowest level the electrolyte may be returned to the compartment of the highest level by any suitable means, for instance as shown in Figs. 3 and 4, by means of a return conduit $J^1$ containing a rotary pump $j$.

In Fig. 5 a construction is shown in which the porous electrodes K are arranged horizontally one above the other in a jar L and separated from each other by frames or rims $l$ forming liquid tight compartments between the several electrodes and an open compartment above the uppermost electrode which compartments receive the electrolyte. The latter flows by gravity from each compartment through its electrode into the compartment next below and finally discharges into the jar L from which it is again returned to the uppermost compartment by a conduit M containing a bulb pump $m$ or by other suitable means.

If desired several horizontal electrodes N may be provided with upwardly projecting rims n forming trays and be supported one above the other within a jar or pan O by means of intervening insulating disks or posts o¹, as shown in Fig. 6. In this view the means shown for elevating the electrolyte from the jar into the top tray consist of a return pipe or conduit P containing a siphon or ejector p.

While my improvements may be embodied in a storage battery in which the electrodes may be variously constructed, it is preferable to construct the same in the form of hollow or bottle-shaped chambers, as shown in Figs. 1, 2, 7 and 8, which are complete independent of the jar. This construction permits of removing any one of the electrodes for inspection, avoids the necessity of tight connections between lead or metal and insulating materials, allows the electrodes to be of uniform size, consequently results in saving of active material and avoids practical difficulties presented in other forms of electrodes.

In all of the several constructions described the electrolyte is circulated as long as the difference in level or pressure between opposite sides of the porous electrode is maintained so that only a comparatively small additional quantity of electrolyte in the supply reservoir need be employed for maintaining a uniform concentration throughout the electrolyte.

It is understood that in all the forms of carrying out my invention the electrodes may be separated by porous diaphragms or partly or entirely covered by porous envelops in any well known way without changing the essential features of my invention.

By means of my invention it is possible to charge a storage battery at a high rate or in a short time without excessive rise of the voltage and my device also permits of maintaining a high voltage during a high rate of discharge which is impossible with storage batteries as heretofore constructed. Furthermore, by maintaining constantly a forced flow of electrolyte through the pores of the electrode while the battery is being charged or discharged and keeping pace with the electro-chemical action within the pores of the electrode, a uniformity in the degree of concentration is maintained throughout the electrolyte in the pores of the electrode.

I claim as my invention:

1. A storage battery comprising a porous storage battery electrode, and means operating to forcibly circulate or push a storage battery electrolyte through the pores of said electrode from one side to the other side thereof, substantially as set forth.

2. A storage battery comprising a porous storage battery electrode, and means for supplying a storage battery electrolyte so that the same is circulated or pushed by gravity through the pores of said electrode from one side thereof to the other, substantially as set forth.

3. A storage battery comprising a porous storage battery electrode, and means operating to maintain a storage battery electrolyte at different levels on opposite sides of said electrode so that said electrolyte is pushed through the pores of said electrode from that side of the same on which the level of the electrolyte is high to the opposite side of the same on which the level of the electrolyte is low, substantially as set forth.

4. A storage battery comprising a jar, a porous electrode constructed in the form of a hollow or bottle-shaped chamber which is independent of said jar, and means operating to force the electrolyte through the pores of the electrode and maintaining a constant flow of the same from inside of the electrode to the interior of the jar or vice versa.

5. A storage battery comprising a porous storage battery electrode which is arranged and constructed to divide a body of storage battery electrolyte so that the same cannot pass from one side of the electrode to the other except through the pores thereof, and a transferring device operating to convey said electrolyte from that side of the electrode on which the electrolyte leaves its pores to that side of the electrode on which the electrolyte enters its pores, substantially as set forth.

6. A storage battery comprising a hollow porous storage battery electrode, and means for forcing a storage battery electrolyte through the pores of said electrode and maintaining a forcible circulation of the electrolyte through the pores of the electrode from one side of the latter to the other, substantially as set forth.

7. A storage battery comprising a jar, a porous electrode arranged in said jar and constructed to separate the electrolyte on opposite sides of the same so that the electrolyte on one side of the electrode may be higher than on the other side, and means for transferring the electrolyte from the low side of the electrode to the high side thereof, substantially as set forth.

8. A storage battery comprising a jar, a porous electrode arranged in said jar and constructed to separate the electrolyte on opposite sides of the same so that the electrolyte on one side of the electrode may be higher than on the other side, a conduit extending from the jar on the low side of the electrode to the high side thereof, and an electrolyte lifting device arranged in said conduit, substantially as set forth.

9. A storage battery comprising a hollow porous electrode, and means for maintaining the electrolyte on the inner and outer sides of said electrode at different elevations, substantially as set forth.

10. A storage battery comprising a jar, a hollow porous electrode arranged in said jar, an elevated electrolyte supply reservoir, a conduit for delivering the electrolyte from said reservoir to the interior of said electrode, and a conduit for transferring the electrolyte from the jar outside of the electrode to said reservoir, substantially as set forth.

11. A storage battery comprising a jar, a hollow porous electrode arranged in said jar, an elevated electrolyte supply reservoir, a conduit for delivering the electrolyte from said reservoir to the interior of said electrode, a conduit for transferring the electrolyte from the jar outside of the electrode to said reservoir, and an electrolyte lifting device arranged in the last mentioned conduit, substantially as set forth.

12. A storage battery comprising a jar, a hollow porous electrode arranged in said jar, an elevated electrolyte supply reservoir, and a supply conduit tightly connecting the interior of said electrode with said reservoir so that the electrolyte in the electrode, supply conduit and reservoir forms one column or body the level of which is in the reservoir, substantially as set forth.

13. A storage battery comprising a jar, a hollow porous electrode arranged in said jar, an elevated electrolyte supply reservoir, a supply conduit tightly connecting the interior of said electrode with said reservoir so that the electrolyte in the electrode, supply conduit and reservoir forms one column or body the level of which is in the reservoir, and a return conduit for transferring the electrolyte from the jar outside of the electrode to said reservoir, substantially as set forth.

14. A storage battery comprising a jar, a hollow porous electrode arranged in said jar, an elevated electrolyte supply reservoir, a supply conduit tightly connecting the interior of said electrode with said reservoir so that the electrolyte in the electrode, supply conduit and reservoir forms one column or body the level of which is in the reservoir, a return conduit for transferring the electrolyte from the jar outside of the electrode to said reservoir, and an electrolyte lifting or elevating device arranged in said return conduit, substantially as set forth.

15. A storage battery comprising a hollow electrode, a solid electrode, a jar containing said electrodes, and means for maintaining the electrolyte at different levels on the inner and outer sides of said hollow electrode, substantially as set forth.

16. A storage battery comprising a hollow electrode, a solid electrode, a jar containing said electrodes, means for supplying the interior of the hollow electrode with electrolyte and maintaining the level thereof higher than on the outside of the hollow electrode, and means for transferring the electrolyte from the outside of said hollow electrode to the means which supplies the inside thereof, substantially as set forth.

Witness my hand this 24th day of April, 1906.

EDWARD SOKAL.

Witnesses:
JAMES N. BEAZLEY,
M. L. DEYO